United States Patent
Briquet-Kerestedjian et al.

(10) Patent No.: US 10,602,665 B2
(45) Date of Patent: Mar. 31, 2020

(54) TWO ARMED ROBOTIC SYSTEM FOR ADJUSTING THE HEIGHT OF AN AGRICULTURAL TOOL

(71) Applicant: COMMISSARIAT A L'ENERGIE ATOMIQUE ET AUX ENERGIES ALTERNATIVES, Paris (FR)

(72) Inventors: Nolwenn Briquet-Kerestedjian, Paris (FR); Frederic Colledani, Massy (FR); Christophe Duissard, Chateaugay (FR); Baptiste Lelong, Les Martres de Veyre (FR); Delphin Theallier, Romagnat (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 249 days.

(21) Appl. No.: 15/743,755

(22) PCT Filed: Jul. 12, 2016

(86) PCT No.: PCT/EP2016/066536
§ 371 (c)(1),
(2) Date: Jan. 11, 2018

(87) PCT Pub. No.: WO2017/009334
PCT Pub. Date: Jan. 19, 2017

(65) Prior Publication Data
US 2018/0199502 A1 Jul. 19, 2018

(30) Foreign Application Priority Data
Jul. 16, 2015 (FR) ...................................... 15 56701

(51) Int. Cl.
*A01D 47/00* (2006.01)
*A01D 46/30* (2006.01)
(Continued)

(52) U.S. Cl.
CPC ............ *A01D 47/00* (2013.01); *A01B 63/008* (2013.01); *A01B 63/02* (2013.01); *A01D 46/30* (2013.01)

(58) Field of Classification Search
CPC ... A01D 47/00; A01D 46/30; A01B 63/00–32
See application file for complete search history.

(56) References Cited

U.S. PATENT DOCUMENTS 3,769,782 A * 11/1973 Cler ........................ A01D 47/00
56/51
3,855,761 A * 12/1974 Louks .................... A01D 47/00
56/51
(Continued)

FOREIGN PATENT DOCUMENTS

AU 53874 73 A 10/1974
FR 2 632 486 A1 12/1989
(Continued)

OTHER PUBLICATIONS

International Search Report dated Nov. 9, 2016 in PCT/EP2016/066536 filed Jul. 12, 2016.
(Continued)

*Primary Examiner* — Robert E Pezzuto
*Assistant Examiner* — Adam J Behrens
(74) *Attorney, Agent, or Firm* — Oblon, McClelland, Maier & Neustadt, L.L.P.

(57) ABSTRACT

A robotic system for use in agriculture includes at least one tool-holding arm to hold an agricultural tool and capable of being controlled to enable the agricultural tool to be raised or lowered, a sensor for measuring the height of crops, and a computer to determine a set value for controlling the at least one tool-holding arm on the basis of measurements taken by the sensor for measuring the crop height. The tool-holding arm is connected to a connection member such that it can be mounted on a control arm provided on an
(Continued)

agricultural vehicle. The computer can determine a set value for controlling the control arm to enable the tool-holding arm to be raised or lowered on the basis of measurements taken by the sensor for measuring the crop height.

15 Claims, 3 Drawing Sheets

(51) Int. Cl.
*A01B 63/00* (2006.01)
*A01B 63/02* (2006.01)

(56) References Cited

U.S. PATENT DOCUMENTS

| | | | |
|---|---|---|---|
| 4,183,411 A | 1/1980 | Bourquin | |
| 4,197,691 A | 4/1980 | Woodruff | |
| 4,197,694 A * | 4/1980 | Hagie | A01D 47/00 56/10.2 E |
| 4,663,925 A * | 5/1987 | Terada | A01D 46/24 382/153 |
| 4,975,016 A * | 12/1990 | Pellenc | A01D 46/24 414/501 |
| 8,381,502 B2 * | 2/2013 | Dunn | A01D 47/00 56/10.2 E |
| 2012/0304610 A1 * | 12/2012 | Dunn | A01D 47/00 56/17.1 |
| 2016/0157411 A1 * | 6/2016 | Lysaght | A01B 39/14 172/1 |
| 2016/0183462 A1 * | 6/2016 | Magisson | A01D 47/00 56/189 |

FOREIGN PATENT DOCUMENTS

| | | | | |
|---|---|---|---|---|
| GB | 2495497 A | | 4/2013 | |
| WO | WO-9853961 A1 * | | 12/1998 | A01D 46/24 |

OTHER PUBLICATIONS

French Search Report dated May 6, 2016 in FR 1556701 filed Jul. 16, 2015.
Loop, Charles et al., "Computing Rectifying Homographies for Stereo Vision," Microsoft Research, Microsoft Corporation, Technical Report MSR-TR-99-21, Apr. 1999, 14 pages.

* cited by examiner

TWO ARMED ROBOTIC SYSTEM FOR ADJUSTING THE HEIGHT OF AN AGRICULTURAL TOOL

TECHNICAL FIELD

The field of the invention is that of agricultural robotic systems. The invention more particularly aims at a system enabling the position of an agricultural tool, such as a plant cutting or pulling tool, to be automatically adjusted. It finds in particular an application in automation of mechanical castration operations of seed maize production fields.

STATE OF PRIOR ART

Maize is an autogamic plant strongly subjected to heterosis effect, that is the improvement in capabilities and vigour of the plant under the hybrid or heterozygous form with respect to the plant under the homozygous form. The work of selectors schematically consists in crossing homozygous parent lines in order to obtain a hybrid combination which will be more productive and more vigorous and will have interesting agronomic characteristics.

The maize plant is monoecious, consisting of a male inflorescence, called panicle, which is found at the top of the plant and is responsible for pollen emission, and a female inflorescence at mid-height of the plant, at the base of a leaf. The female inflorescence is comprised of stigmas or receiving silks which will be fertilised by pollen, and will result in the ear initiation.

The hybrid seed production is made by culturing in a same plot, generally on interpolated rows, plants of two hybrid parent lines. The panicle of the female parent line is tipped before flowering for these plants to be fertilised by pollen from the male parent line. The cobs harvested on this female parent line also carry hybrid grains which will be marketed. The hybrid production is not limited to obtaining simple hybrids from crossing two maize lines, and also relates to crossing a hybrid and a line (three-way hybrid) or crossing two hybrids (double cross hybrid).

Tipping, that is the removal of the male panicle on female parents before flowering, is thus an essential step in the hybrid maize seed production process. Indeed, the presence of pollen, even in a small amount, causes self-fertilisations on these female parents and a contamination in the hybrid production. This maize tipping was traditionally made manually and the labour cost generated by this step significantly influenced the production cost of hybrid seed. This step has thus been attempted to be mechanised by means of different tools, in particular cutter tools to cut the tip of the plants and roll tools to pull the panicle or the kernel (all the leaves surrounding the panicle).

The mechanical castration process can be made either with one or more cutter passages only, or in two stages. In a first stage, a cutter passage is made on the female parent rows: rotating blades cup the top of the male plant. The ideal cutting height is located three quarters up the kernel, or three quarters up the panicle if this projects from the kernel. From two to five days later, when the panicle has a bit regrown (2 to 5 cm) but before it is sufficiently open to emit pollen, a roll or tire pulling is performed. The purpose is to catch the panicle with rolls or tires by pulling as little as possible the kernel or the leaves which would be still around. For this, rolls are to be placed at the base of the panicle while remaining above the leaves. The first cut will result in an even crop size such that the panicle which has a quicker growth than the rest of the plant projects from the foliage. The purpose of the second stage is to pull the rest of the panicle and thus to suppress any self-fertilisation risk.

During these mechanical castration operations, the farmer visually assays the optimum cutting height of the panicle, from his/her machine cab and controls the cutting or pulling tool height. Generally, two contiguous rows are simultaneously cut at the same height which enables time to be saved but risks to be detrimental to the cut of one of both rows if the plants are not of homogeneous sizes. The cutting quality is thus limited by the driver reactivity but also by the accuracy allowed by the current machine architecture. Consequently, many panicles are not cut at the right height. At the end of both mechanical castration steps, only 70% to 80% of the panicles are fully removed.

Then, it is necessary to make a manual castration operation of the remaining panicles (or the remaining parts of the cut panicles when the cutting did not allow for the full removal of the panicle) in order to fulfil purity standards defined by the GNIS (Groupement National Interprofessionnel des Semences et plants) for seed maize production. This cumbersome step is made by seasonal workers and represents some cost for the producer.

Unlike manual castration, in all the currently available mechanical castration systems, removing the panicle cannot be dissociated from removing the leaves, in particular the kernel leaves. This plant material removal will be detrimental to the plant in its future development and will impact the final crop yield and thus the seed grower farmer's return.

The improvement of mechanical castration devices is an actual issue in agricultural machinery. The object is to optimise panicle pulling while minimising plant removal. On the other hand, an automated cutting management should enable the machine driver to be released from the attention necessary to cut setting, and thus the machine rate of advance to be increased. Finally, the improvement of this castration could enable costs associated with the final manual checking step to be reduced.

In this regard, a system provided by the SARL Duissard relies on two batches of emitting/receiving photoelectric cells placed upstream of the cutting tools and located 13 cm one below the other, on either side of two rows. These cells operate in direct detection: an infrared beam is emitted by the photoelectric cell whereas a reflector, located in front of it, reflects the beam to the cell which receives it. If maize is found on the beam path, then this will not be received by the photoelectric cell. The maximum height is detected when the lower cell sees maize (beam obstructed by maize thus not perceived by the lower cell) and when the upper cell does not see it (beam perceived by the upper cell), within the accuracy of the gap between both photocells, that is 13 cm. Thus, when both cells see maize (both beams are obstructed) then the cutting height is too low and a cylinder is elongated for the arm bearing the cutting tools to raise. Conversely, when none of both cells see maize (both beams are received by the cells), then the cutting height is too high and the cylinder rod collapses for the arm to lower. Setting a time out is necessary to preserve the setpoint during several seconds because the time for detecting and sending the setpoint are too brief with respect to the time necessary for moving the arm.

This system thus sends a "go no-go" setpoint to the actuator (raise or lower) because of the presence of only two photocells. The system thus attempts permanently to adjust the cutting height with repeated and sometimes conflicting setpoints which strongly appeals to it.

On the other hand, as soon as the cells see void, for example between two maize individual plants, the entire arm will go down to raise just after at the next individual plant. Likewise, at the end of a row, the entire system will go down and probably miss the first individual plants of the next row.

The accuracy degree is on the other hand limited by the vertical spacing between both batches of photocells, that is 13 cm. The cells further process the information for two rows simultaneously, thus the maize individual plant of the lowest row will be cut too high. Finally, the overall space of the entire system remains a problem for farmers.

DISCLOSURE OF THE INVENTION

The invention aims at improving existing systems for automating plant cutting or pulling operations, and for this, provides a robotic system for use in agriculture, comprising at least one tool-carrying arm intended to carry an agricultural tool and capable of being controlled to enable the agricultural tool to be raised or lowered, a plant height measuring sensor, and a calculator configured to determine a setpoint for controlling the at least one tool-carrying arm from measurements made by the plant height measuring sensor, characterised in that the tool-carrying arm is connected to a connection member for loading it on a handling arm provided on an agricultural vehicle, and in that the calculator is further configured to determine a setpoint for controlling the handling arm enabling the tool-carrying arm to be raised or lowered from measurements made by the plant height measuring sensor.

Some preferred but not limiting aspects of this system are the following ones:
- it comprises at least two tool-carrying arms connected to the connection member, each tool-carrying arm being associated with a crop row, and the calculator is configured to:
  - determine the setpoint for controlling each of the tool-carrying arms from height measurements of the plants present in the row associated with the tool-carrying arm;
  - calculate an intermediate setpoint for controlling the handling arm for each of the rows from height measurements of the plants present in each of the rows; and
  - average the intermediate setpoints calculated for each of the rows to determine the setpoint for controlling the handling arm;
- the at least one tool-carrying arm has a clearance the amplitude of which is lower than that of the handling arm clearance;
- the calculator is configured to determine the setpoint for controlling the at least one tool-carrying arm based on height measurements of plants present over a first distance upstream of the current position of the agricultural tool in the vehicle path direction, and to determine the setpoint for controlling the handling arm based on height measurements of plants present over a second distance upstream of the current position of the agricultural tool in the vehicle path direction, the second distance being higher than the first distance;
- the height measuring sensor is a light curtain apparatus or a stereoscopic imaging system;
- the agricultural tool is a plant cutting or pulling tool, in particular for maize.

The invention also extends to an agricultural vehicle piece of equipment comprising a handling arm and the system according to the invention pre-loaded on the handling arm through the connection member, as well as to a vehicle provided with such a piece of equipment.

BRIEF DESCRIPTION OF THE DRAWINGS

Further aspects, purposes, advantages and characteristics of the invention will better appear upon reading the following detailed description of preferred embodiments thereof, given by way of non-limiting example, and made in reference to the appended drawings in which.

DETAILED DISCLOSURE OF PARTICULAR EMBODIMENTS

In the description hereinafter, the terms "front" and "rear" should be understood as relating to a direction of advance of an agricultural vehicle. The same is true for the terms "longitudinal" and "transverse", the direction of advance being longitudinally. Finally, the terms "horizontal" and "vertical" should be understood as relating to a perfectly flat ground on which the agricultural vehicle would run.

The invention is concerned with a robotic system for use in agriculture. It is generally applicable to any field where an agricultural tool height adjustment is necessary, in particular for plant cutting or pulling tools such as those used for maize castration or cereal harvest.

Figure 1:
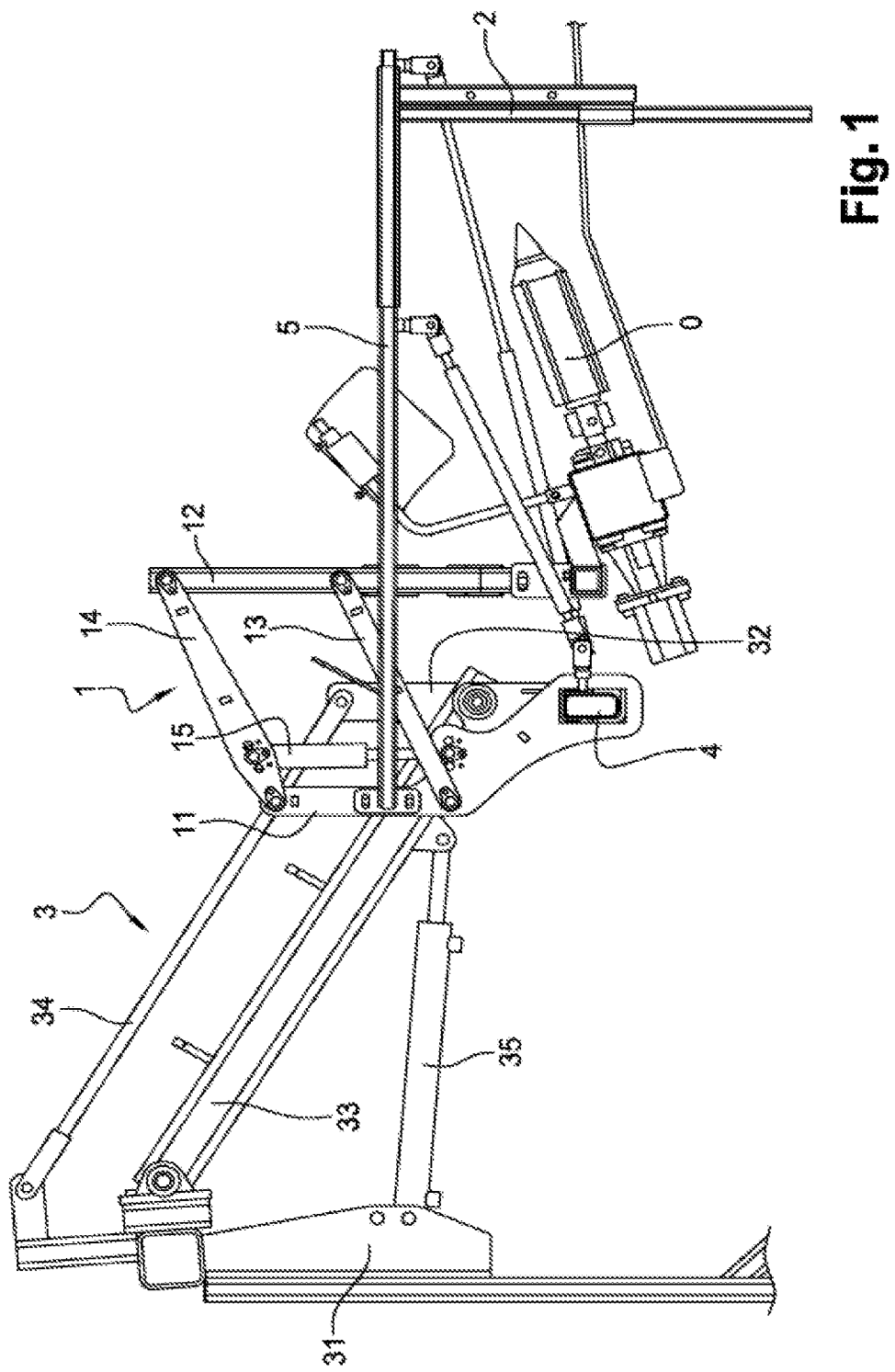
FIGS. 1 and 2 are schematic views of a system according to one possible embodiment of the invention, respectively in side and perspective views.
Figure 2:
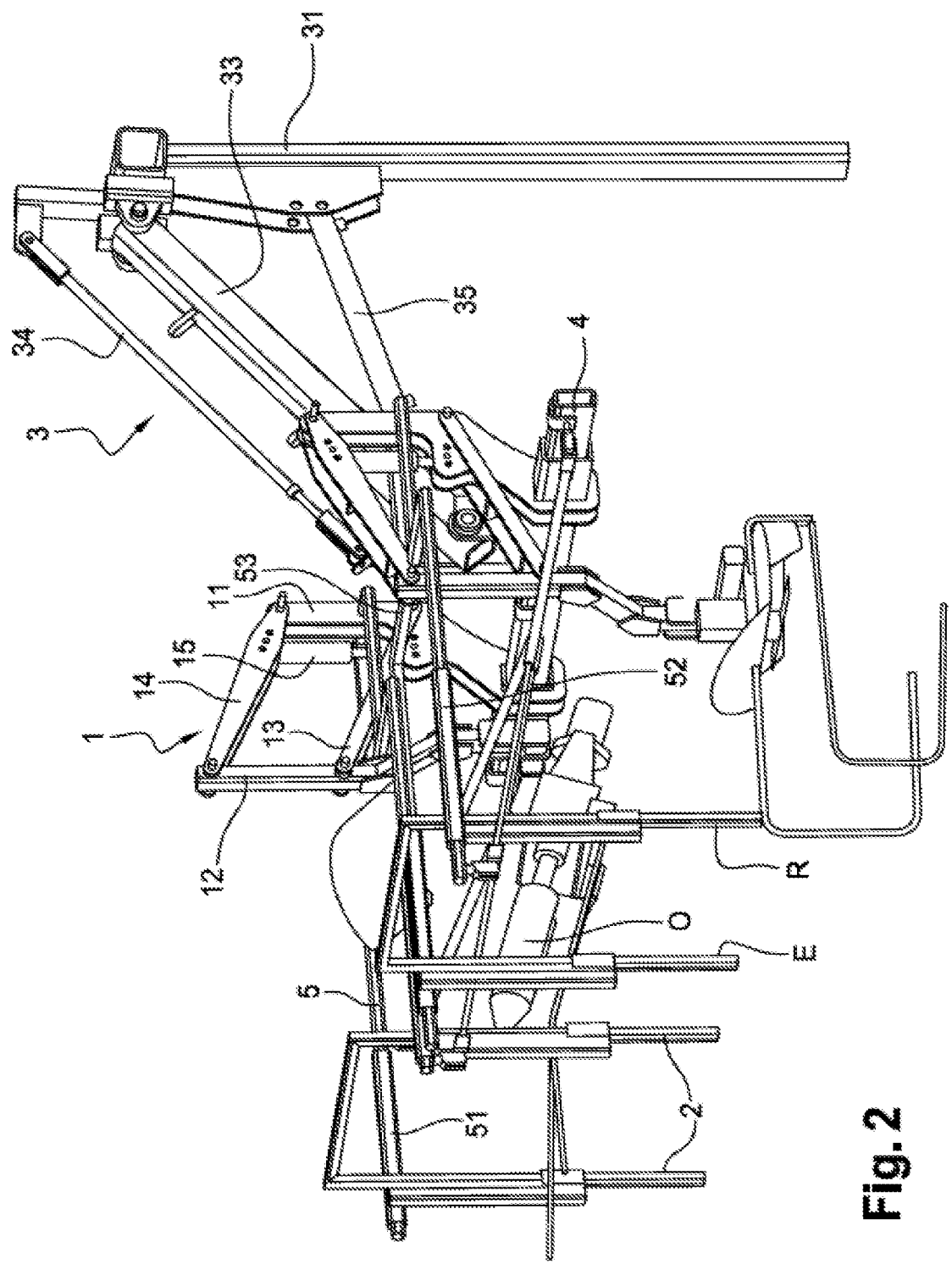

In reference to FIGS. 1 and 2, the invention is concerned with a robotic system which comprises at least one tool-carrying arm 1 intended to carry an agricultural tool and capable of being controlled to enable the agricultural tool to be raised and lowered, a plant height measuring sensor 2, and a calculator configured to determine a setpoint for controlling the tool-carrying arm from measurements made by the plant height measuring sensor.

The agricultural tool O is typically a cutting tool (for example a cutter cutting tool) or a pulling tool (for example with tires or rolls) for plants. Such a tool generally comprises a cutting or pulling instrument (cutters, tires or rolls), an instrument driving engine, a plant guide and a protective case.

Within the scope of the invention, the tool-carrying arm 1 is connected to a connection member 4 enabling it to be loaded on a handling arm 3 provided on an agricultural vehicle. The calculator is further configured to, from measurements made by the plant height measuring sensor 2, determine a setpoint for controlling the handling arm 3 enabling the tool-carrying arm 1 to be raised or lowered.

For maize castration, the agricultural vehicle used is a high clearance tractor which makes it possible to circulate between maize rows and to cut or pull several contiguous female parent rows simultaneously. A high clearance tractor generally includes two or four handling arms upstream of the vehicle, each handling arm carrying two cutting or pulling tools in order to simultaneously castrate two contiguous rows, which makes it possible to save time. In one possible embodiment of the invention represented in FIG. 2, the system thus comprises two tool-carrying arms that can be loaded via a connection member on a same handling arm of the agricultural vehicle. Of course, the invention is not limited by the number of tool-carrying arms that can be loaded together on a same handling arm.

A handling arm 3 is conventionally a parallelogram arm which comprises, as represented in FIGS. 1 and 2, a rear vertical post 31 forming the main structural connection with the agricultural vehicle, and a front vertical post 32 at the lower end of which the connection member 4 connected to the tool-carrying arm(s) 1 can be mounted. The vertical posts 31 and 32 are connected to each other by connection posts 33 and 34 pivotably mounted with respect to the rear vertical post 31. A cylinder 35 is mounted between the rear vertical post 31 and the connection post 33, and provides means for pivotably adjusting the connection post 33 with respect to the rear vertical post 31, the height of the front end of the connection post 33, and hence the height of the front vertical post 32 and thus of the connection member 4 of the tool-carrying arm(s) 1.

Each tool-carrying arm 1 can also be a parallelogram arm which comprises a rear vertical post 11 mounted to the connection member 4, and a front vertical post 12 at the lower end of which an agricultural tool O can be mounted. The rear vertical post 11 of each tool-carrying arm 1 is made integral with the front vertical post 32 of the handling arm 3 through the connection member 4. Alternatively, rather than to be actuated via a gear reduction parallelogram, the tool-carrying arms 1 can be actuated by direct engagement.

Returning to the case of a parallelogram arm, the vertical posts 11 and 12 of a tool-carrying arm 1 are connected to each other by connecting posts 13 and 14 pivotably mounted with respect to the rear vertical post 11. A cylinder 15 is mounted between the rear vertical post 11 and the connection post 14, and provides means for pivotably adjusting the connection post 14 with respect to the rear vertical post 11, the height of the front end of the connection post 15, and hence the height of the front vertical post 12 and of the agricultural tool O.

As represented in FIG. 2, two tool-carrying arms can be mounted to the connection member 4, wherein this latter can take the form of a connection bar mounted to the lower end of the front vertical post 32 of the handling arm 3. Both tool-carrying arms are more precisely arranged on the connection member 4 such that the tools carried by each of the tool-carrying arms can provide cutting or pulling of two adjacent rows.

A plant height measuring sensor 2 capable of making the height measurement of the plants present in a crop row is provided. The calculator receives height measurements made for each of the rows, and determines the height at which each of the tools should be placed.

The calculator is preferably configured to determine a setpoint for controlling the handling arm 3 enabling a positioning of the tools to be made at an average height at which the tool(s) should be placed. The mass taken on by the handling arm is significant (it carries in particular two tool-carrying arms and two tools) and its movements are thus rather slow. But the variations in handling arm height are relatively low.

A control setpoint is on the other hand individually provided to each of the tool-carrying arms by the calculator, enabling the height of a tool to be individually adjusted and thus the cutting or pulling to be individualised per row. Each of the tool-carrying arms thus positions the tool at the optimum cutting or pulling height of each individual plant of a row, as determined by virtue of a cutting or pulling strategy examples of which are detailed later. The mass taken on by a tool-carrying arm is relatively low, and its movement is quicker than that of the handling arm, which enables to suit variations in plant to plant height which can be relatively significant (typically, variations between −200 mm and +200 mm along a row).

Thus, it is foreseen that the tool-carrying arm has a clearance with a lower amplitude than the clearance of the handling arm. The handling arm, provided with a large clearance, has currently the role of being automatically placed at the average height at which the tool(s) should be placed, whereas the tool-carrying arm, with a smaller clearance but quicker, ensures row cutting or pulling.

By resorting to two arms (tool-carrying arm and handling arm) to ensure tool positioning, it is possible to adjust the handling arm, provided with a larger clearance and slower, at an average height and to use a tool-carrying arm, provided with a smaller clearance and quicker, to be accurately and quickly adjusted to the height of each individual plant. By allowing an optimised cutting or pulling, this mechanical architecture thus enables the cost efficiency of mechanical castration operations to be improved. Pulling the panicle is made actually without excess plant removal which would negatively impact the yield. The number of panicles remaining to pull by hand is further particularly reduced. Automating the tool positioning thus enables the driver to be dispensed with this task, whereby the machine rate of advance can be increased.

The system according to the invention further has the advantage of being able to be loaded on handling arms of various models of existing agricultural vehicles. The invention also extends to an agricultural vehicle piece of equipment comprising a handling arm and the previously described system pre-loaded on the handling arm through the connection member.

In one possible embodiment represented in FIGS. 1 and 2, the plant height measuring sensor 2 is a light curtain apparatus comprised of an emitter E in the form of a column of light sources, and a receiver R in the form of a column of photoreceptors. The emitter E and the receiver R are mounted so as to face each other and to extend along their longitudinal direction perpendicular to the ground to enable the height of plants present between them to be measured. Each light source of the emitter E is thus capable of emitting a beam, for example in the infrared, towards the photoreceptor facing it.

The emitter E and the receiver R are each carried by a chassis 5 mounted to the rear vertical post 11 of the tool-carrying arm 1 which is integral with the front vertical post 32 of the handling arm 3. This chassis 5 can include two longitudinal stands 51, 52 connected to a transverse bar 53 from which they extend forwardly. Each of the longitudinal stands 51, 52 can support, for example at its front end, a vertical element capable of permitting the emitter E or the receiver R to be mounted and their height to be adjusted with respect to the chassis. The chassis 5 is dimensioned to enable a single crop row to be measured between the emitter and the receiver of the plant height measuring sensor. The length of the longitudinal stands 51, 52 is preferably adjustable in order to set the distance separating the light curtain E, R of the tool O.

Resorting to an emitter E in the form of a column of light sources and a receiver R in the form of a column of photoreceptors enables the sensors upstream of the agricultural tool to be multiplied which allows making up a raise or lower setpoint for the arms 1, 3, not "go no-go" but on the contrary which is accurate and quantised.

An example of height measuring sensor that can be used within the scope of the invention is a measuring light curtain A-GAGE™ EZ-ARRAY™ provided by the Turck Banner Company. A sensor the curtain height of which is 600 mm with a 5 mm resolution can be chosen in particular, scanning being made from bottom to top in 9.3 ms at best.

It will be noticed that this sensor has the advantage of not being disturbed by solar exposure and machine vibrations. Optionally, a compressed air jet device is associated therewith to reject dust or drops which could be deposited onto the sensor.

This sensor has the advantage of providing several measurement modes, to provide different indications as the first obstructed beam, the last established beam, the total number of obstructed beams, etc. The mode marking the last obstructed beam can be favoured because it enables the plant profile to be obtained by locating the maximum plant height using the light curtain. Thus, in one embodiment of the invention, the height measuring sensor is configured to perform a straight scanning along which all the beams between a light source and a photoreceptor facing each other are scanned in turn from the beam closest to the ground, and to provide an indication relating to the last blocked beam.

In another possible embodiment, the plant height measuring sensor is a vision sensor, for example a time of flight camera or a stereoscopic imaging system the use of which is described in the following.

The stereoscopic imaging system comprises two cameras mounted so as to be able to image, from two distant points of view, a same scene located in front of the agricultural tool in the vehicle path direction. Both cameras are carried by a stereoscopic head.

The stereoscopic imaging system further comprises a computing processing unit configured to make up, from images delivered by the cameras, a 3D reconstruction representative of the relief of the scene which is imaged. The computing processing unit can be offset from the cameras.

The cameras of the stereoscopic imaging system produce two twin photographs at the same time, called a stereoscopic couple, which are slightly spatially offset. These will enable the plant relief to be rendered by the implementation of the following steps:

calibrating the focusing system;
rectifying the images;
matching homologous points between both images (from the projection of a same point of the environment);
reconstructing the 3D point of the environment from the pairs of homologous points.

Since the base line between both cameras is assumed to be fixed, the calibrating step is made prior to the reconstruction run and remains valid as long as the mechanical stability of the stereoscopic head is ensured. The next steps are made at each instant to produce a new 3D reconstruction of the environment to take a change either in the vehicle position either in the surface which is observed into account.

The calibration step can be made by observing a known object (a test chart) under different angles and simultaneously viewed by both cameras. The matching on each pair of images of several characteristic points of the test chart enables the projection matrix of each camera (intrinsic parameters) as well as the geometric transformation connecting both cameras (extrinsic parameters) to be assessed.

The parameters from the calibration enable a rectifying function which aligns the lines of the left camera with those of the right camera to be applied. This operation makes it possible to speed up and make more robust the pairing between the points of both images corresponding to a same 3D point. The transformation chosen has to ensure that the quality of the signal contained in the image (minimising smoothing and interpolation is preserved). An example of this type of algorithm is presented in the paper of Loop and Chang, entitled "Computing rectifying homographies for stereo vision" Int. Conference CVPR, 1999.

Once both images are rectified, a matching of both images provided by the cameras is then made the purpose of which is to retrieve homologous points between both images, that is the projections of the same points of the scene which is imaged. Thus, it is identified that a point p1 in the left image and a point p2 in the right image are the projection of a same point P of the scene which is imaged. The coordinates X, Y, Z of this point P can thereby be calculated.

To do this, the first image is travelled and for each pixel of this image, in the second image acquired at the same instant, the pixel corresponding to the same physical point is searched for. By virtue of rectification, this pixel is found on the same line of the second image as the origin pixel of the first image. This requirement reduces search time and error risks. To perform the search, a neighbouring of the origin pixel is considered and along the line, the pixel having the most resembling neighbouring is searched for. Different correlation scores have been suggested in literature, being a compromise between quality and quickness. This search is iterated for all the pixels of the line of the origin image, and then to all the lines of the same image. Order requirements between successive pairings as well as so-called "overall" algorithms enable pairings made by removing the aberrant results to be consolidated. For each pairing, the distance between the columns of both paired pixels can be saved: this is called disparity, this disparity being linearly related to the depth of the corresponding 3D point.

During the last step, for each pairing made between both images and by using the knowledge of the system calibration parameters, the corresponding 3D point can be reconstructed by triangulation. For all pairings made between both images, a set of 3D points the coordinates of which are expressed in the reference frame of one of the cameras (or in an arbitrary reference frame rigidly related to one of the cameras) is reconstructed.

By orienting the stereoscopic head to the maize rows, the 3D points which are reconstructed correspond to points of the "canopy". A surface relying on these reconstructed 3D points can thus be reconstructed and the imaged scene be modelled. Once it is reconstructed, this surface can be analysed to determine the lines of peaks connecting the tops of the individual plants belonging to a same row and the valleys corresponding to the inter-row space. Furthermore, to facilitate search for these zones of maximum curvatures, the 3D surface which is reconstructed being expressed in the reference frame of the stereoscopic head and being thus able to be expressed in the vehicle reference frame, the peak lines and the valleys searched for are in a direction parallel to the vehicle movement.

As a function of the field of view width of the stereoscopic head, several rows can be simultaneously imaged. The stereoscopic imaging system can thus be adapted to be capable of imaging and measuring simultaneously the height of several crop rows.

The 3D reconstruction thus provides a piece of information representative of the relief of the scene imaged in a matrix form in rows and columns where each point of the matrix provides a piece of information representative of the distance between the stereoscopic imaging system (more precisely the middle point between the cameras on the base line) and the top of the plants present in the scene which is imaged.

The computing processing unit can be configured to identify for each row or row portion of the 3D reconstruction the highest point, or calculate for each row or row portion of the 3D reconstruction, the average of the points present in the row or row portion, so as to provide the height measurement information on a crop row.

The cameras from the stereoscopic imaging system can be mounted so as to be fixed with respect to the agricultural vehicle, by being either directly onboard the vehicle, or supported by the handling arm. Alternatively, they can be mounted so as to be fixed with respect to the tool-carrying arm, by being for example positioned on its front vertical post 12.

Figure 3:
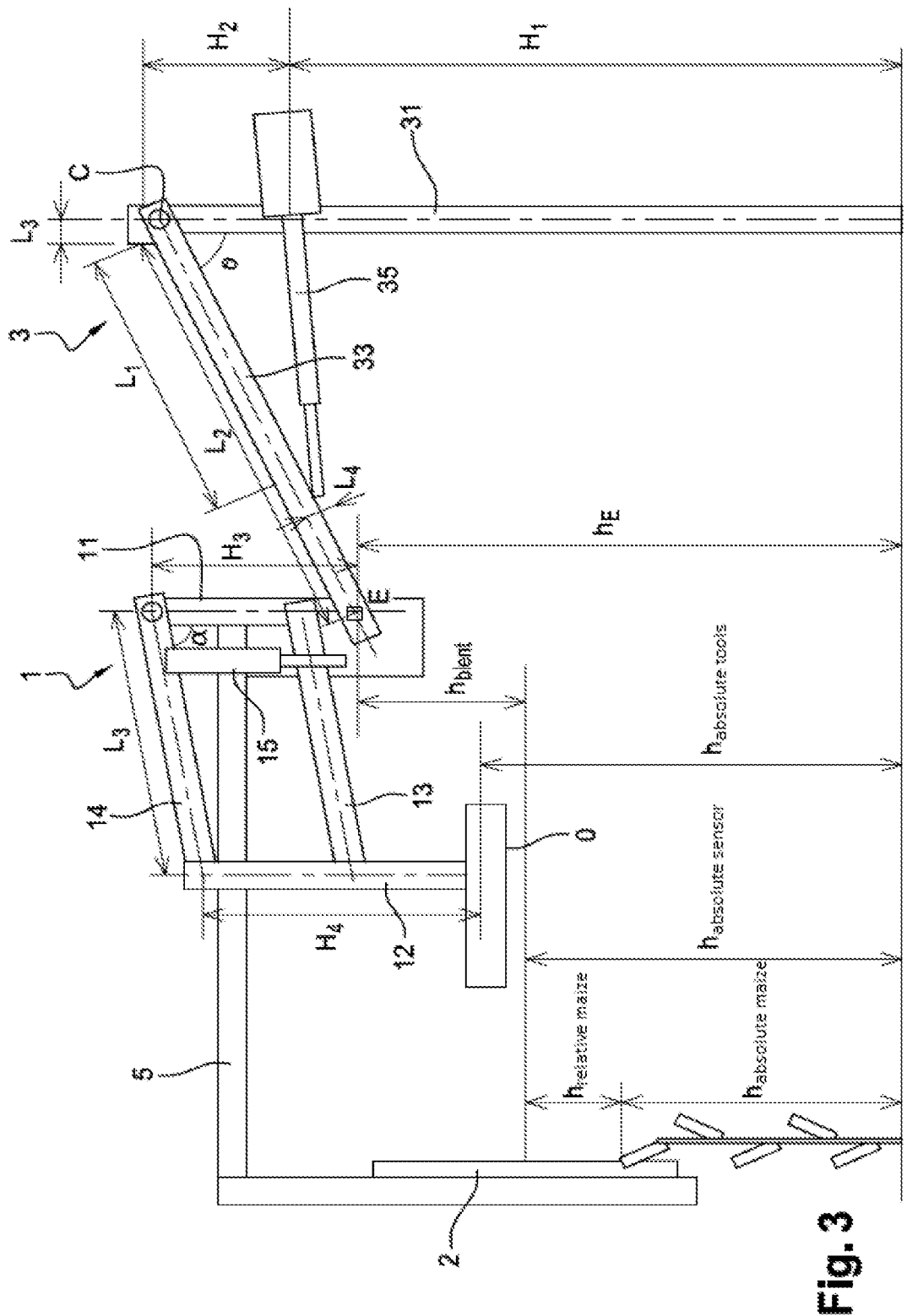
FIG. 3 is a scheme of a simplified model of a system according to one possible embodiment of the invention.

A simplified model of the arms 1, 3 with a tool O and the height measuring sensor 2 of the first embodiment (light curtain) is provided in FIG. 3. In what follows, a method for determining the control setpoints is thus introduced using a maize height measurement made by a light curtain.

To calculate the absolute height at which the middle point of the sensor $h_{absolute\ sensor}$ is located, the angle $\theta$ is used, measured for example using an angular position sensor C, between the rear vertical post 31 and the connection post 33 of the handling arm 3. Cylinders integrating a measurement of their elongation can also be used. By geometry, the following relationship is obtained:

$$h_E = H_1 + H_2 - L_2 \cos\theta \quad (1)$$

The following relationship can also be determined:

$$h_{absolute\ maize} = \quad (2)$$
$$h_{absolute\ sensor} + h_{relative\ maize} = h_E + H_{bSlow-sensor} + h_{relative\ maize}$$

with $H_{bSlow-sensor}$ the height difference between the front end of the connection post 33 (point E) and the middle of the height measuring sensor 2, and $h_{relative\ maize}$ the relative maize height with respect to the middle of the height measuring sensor (value between −300 mm and +300 mm for a light curtain with a length $L_{sensor}$ of 600 mm).

The height measuring sensor 2 sends back a voltage $U_{sensor}$ between $U_{no-load\ sensor}$, the no-load sensor voltage, and $U_{max\ sensor}$, the maximum sensor voltage (10V for the sensor used), proportional to the height of the last beam obstructed by maize. The relative maize height $h_{relative\ maize}$ by virtue of the formula:

$$h_{relative\ maize} = $$
$$\frac{L_{sensor}}{U_{max\ sensor} - U_{no-load\ sensor}}(U_{sensor} - U_{no-load\ sensor}) - 0.5\ L_{sensor}$$

Similar calculations are applicable in the case where a vision sensor is employed substituting for the light curtain. These calculations are to be adapted depending on whether the vision sensor is integral with the tool-carrying arm, the handling arm or the vehicle.

Once the maize height is determined for each row, the calculator determines the setpoints for controlling the arms for each row, which consists in determining, for each row, the tool height $h_{absolute\ tools}$ for the tool-carrying arm 1, and the height $h_E$ of the front end of the connection post 33 of the handling arm 3.

When the handling arm 3 supports several tool-carrying arms, the setpoint for controlling the handling arm can be the average of the setpoints $h_E$ determined for each row. Thus, when the system comprises at least two tool-carrying arms connected to the connection member, each tool-carrying arm being associated with a crop row, the calculator is thereby configured to:

determine the setpoint for controlling each of the tool-carrying arms from height measurements of plants present in the row associated with the tool-carrying arm;

calculate an intermediate setpoint for controlling the handling arm for each of the rows from height measurements of the plants present in each of the rows; and average the intermediate setpoints calculated for each of the rows to determine the setpoint for controlling the handling arm, after a possible filtering of the intermediate setpoints to avoid useless movements.

In the following, thanks to equation (1), there is the angle $\theta$ to be slaved:

$$\theta = a\cos\left[\frac{1}{L_2}(H_1 + H_2 - h_E)\right]. \quad (4)$$

Finally, it is noted that:

$$h_{absolute\ tools} = h_E + H_2 - L_2 \cos\alpha - H_4 \quad (5).$$

Hence, there is the following relation setting the angle $\alpha$ to be slaved between the rear post 11 and the connection post 14 of the tool-carrying arm:

$$\alpha = a\cos\left[\frac{1}{L_3}(h_E + H_3 - H_4 - h_{absolute\ tools})\right]. \quad (6)$$

According to different possible implementations of the invention, in equation (6), $h_E$ can be considered as coming from the calculation of the setpoint for controlling the handling arm, or as being the height of the point E used upon calculating (that is $H_1 + H_2 - L_2 \cos\theta$, with $\theta$ the angle measurement obtained by the angular position sensor).

Hereinafter, different strategies for making up the setpoints for controlling the arms 1, 3 are detailed.

The purpose of cutter cutting is to clear the view onto the row by cutting just enough leaves and panicles such that the latter can still regrow thereafter. The cutting should be thus relatively homogenous, without creating too many irregularities. The ideal cutting height of the panicle is located three quarters up of the same. This assumes to mark the height of the base and the top of the panicle to mark the three quarters thereof, which is hardly reproducible with sensors, insofar as the panicle can be hidden within the kernel. On the other hand, to impose a cutting height at a number of centimetres below the individual plant top is not adapted because the panicle can both be closed to this top and much lower. It is thus necessary to obtain a relative measurement, adapted to each maize individual plant and to different architectures of plants (upright habit, trailing leaves, . . . ).

Upon pulling, it is necessary to remove all the panicles that have regrown. Since the panicles regrow quicker than the leaves, the purpose is that the leave height remains relatively homogeneous in order that the panicles project therefrom. For this, the abrupt height variations during cutting should be limited in order to be then able to follow these variations upon pulling. For pulling, it is necessary to place the rolls or tires as close as possible to the tip of the leaves in order to pull the panicles which project therefrom without removing too many leaves.

Several strategies can thus be contemplated depending on their relevancy as regards cutting or pulling. Each strategy can rely on the fact that the time elapsed between two acquisitions of the height measuring sensor is converted into the distance travelled thanks to the rate calculated at each instant.

The light curtain being located upstream of the tool(s) (in a similar way, a vision sensor will image a scene located upstream of the tool(s)), the setpoint to be sent to the actuators of the cylinders 15, 35 at an instant t is not calculated thanks to the acquisition of the sensor at the same instant t but thanks to the prior acquisitions. Thus, the acquisitions are stored step by step and then the setpoint is calculated from a small sample of acquisitions, the first acquisition being located at a distance $d_{Offset}$ from the current acquisition. The setpoint is then calculated from the acquisitions included on a distance $d_{Ech}$ and which correspond to the acquisitions of plants currently located at the tools.

The setpoints which are sent are then calculated from prior measurements made when the measuring sensor travelled the distance $d_{Ech}$ or imaged the canopy over the distance $d_{Ech}$ in the vehicle path direction upstream of the current position of the tool(s).

Thus, the system according to the invention can further comprise a memory in which the measurements made by the height measuring sensor are recorded, and the calculator can be configured to provide the control setpoints based on measurements previously recorded in the memory and corresponding to the acquisitions relating to plants found over a distance $d_{Ech}$ upstream of the current position of the tool(s).

Within the scope of this embodiment, it is important to accurately know the vehicle movement speed in order to operate not in elapsed time but in travelled distance. To do this, the system can comprise a rate of advance measuring sensor in the vehicle path direction, and the calculator is thereby configured to determine the distance travelled along the path direction between two measurements successively made by the height measuring sensor. In other words, it is possible to timestamp the samples in memory with the instantaneous rate, to make it possible to determine thereafter, upon calculating the setpoints, which samples correspond to the acquisitions relating to the distance $d_{Ech}$ in the vehicle path direction upstream of the current position of the tool(s) (more or less samples depending on whether the movement is quick or slow).

The rate of advance measuring sensor can consist of a proximity inductive sensor associated with a plastic wheel attached in the rim of a vehicle wheel and on the perimeter of which metal pins are arranged. At each passage in front of a metal pin, the signal output from the sensor is modified. Thus, the rate of advance can be deduced by calculating the time elapsed between two raising edges of the output signal, that is between two metal pins, insofar as the chord length between these two points is known.

In one embodiment, a higher distance $d_{Ech}$ for the handling arm (equivalent for example to the distance between 4 to 6 plants) than for the tool-carrying arm (equivalent for example to the distance between 2 to 4 plants) is considered. Indeed, the purpose of the tool-carrying arm is to individualise cutting or pulling, with a trend to a plant to plant specific processing, whereas the handling arm is simply used to be adjusted at an average height at which the tool(s) should be placed. Thus, in this embodiment, the calculator is configured to determine the setpoint for controlling at least one tool-carrying arm based on height measurements of plants present over a first distance upstream of the current position of at least one agricultural tool in the vehicle path direction, and to determine the setpoint for controlling the handling arm based on height measurements of plants present over a second distance upstream of the current position of the at least one agricultural tool in the vehicle path direction, the second distance being higher than the first distance.

The calculation of the setpoints from the measurements of the absolute maize height $h_{absolute\ maize}$ can be made in different ways depending on the strategy chosen.

In one embodiment, the calculator is configured to determine a setpoint for controlling an arm from the average of said measurements previously made by the height measuring sensor over a predetermined distance $d_{Ech}$.

This embodiment corresponds to a so-called "average" strategy according to which for the $d_{Ech}$ acquisitions, the average maize height is calculated. The setpoint which is sent is then equal to this average height from which a height $h_{Offset}$ which depends on the variety cut can be subtracted. This strategy has the advantage of including voids between two plants. It is intended to be used for cutter cutting.

In another embodiment, the calculator is configured to determine a setpoint for controlling an arm from the maximum of said measurements previously made by the height measuring sensor over a predetermined distance $d_{Ech}$.

This embodiment corresponds to a so-called "maximum" strategy according to which for the $d_{Ech}$ acquisitions, the maximum height is marked from the maize heights on this sample. The setpoint which is sent is then equal to this maximum height from which a height $h_{Offset}$ which depends on the variety being cut can be subtracted. This strategy is rather intended to roll pulling. Currently, it has been checked that panicles measuring about 10 mm in diameter are not detectable by the light curtain, only leaves are detected by drawing a relatively rectilinear profile following cutter cutting. The purpose is thus to place rolls just at the top of this profile, insofar as all that projects therefrom can only be the panicle and will be thus pulled out.

In yet another embodiment, the calculator is configured to calculate a leaf density indicating, for each height interval of a set of successive intervals, the percentage of measurements among said measurements made by the height measuring sensor over a predetermined distance $d_{Ech}$ which have a height higher than the lower bound of the height interval, and to determine a setpoint for controlling an arm from the lower bound of the height interval corresponding to a threshold percentage.

This embodiment corresponds to a so-called "leaf density" strategy according to which for the $d_{Ech}$ acquisitions, the minimum height from the maize heights on this sample is identified. Then, a loop is created which defines a current height equal to the minimum height incremented by 5 mm for example at each loop cycle and the percentage of acquisitions which correspond to a higher height than this new current height is calculated. Thus, for the minimum height of the sample, 100% of the acquisitions of the sample have a height higher than the minimum height. Then, as the current height increases, less and less acquisitions have a height higher than the current height. This percentage corresponds to a so-called leaf density. A threshold is defined from which it is estimated that the leaf density is sufficiently low to correspond to the optimum cutting height: indeed, the closer the plant top, the lower the leaf density is supposed to be. It will be noticed that conversely, the leaf density can be assessed from the maximum height and by checking the percentage of acquisitions having a lower height.

The setpoint which is sent is then equal to the current height corresponding to this threshold S, from which a height $h_{Offset}$ which depends on the variety being cut can be subtracted. This strategy is intended to be used for cutter cutting. It is further close to the ideal measurement of the three quarters of the panicles: indeed, it can be imagined that at this ideal height, there is only a percentage of leaves. In addition, it takes the plant architecture into account: for a variety with trailing leaves, there will be more leaves above the panicle than for a variety with an upright habit.

Within the scope of the invention, each of the control setpoints (that of the tool-carrying arm(s) and that of the handling arm) can be made up by applying a strategy with its own parameterising. Preferably, the same strategy is used for each of the setpoints with the same values for $h_{Offset}$, but considering a higher distance $d_{Ech}$ for the handling arm than for the tool-carrying arm(s). The distance $d_{Offset}$ can also be lower for the handling arm than for the tool-carrying arm(s).

The invention is not limited to the system as previously described but also extends to a vehicle, in particular a high clearance tractor, provided with one or more handling arms at least one of which is provided with the system according to the invention.

It also extends to a method for adjusting the height of an agricultural tool by means of a system according to the invention, comprising the steps of:
acquiring measurements from the plant height measuring sensor;
determining a setpoint for controlling the at least one tool-carrying arm from the measurements acquired;
determining a setpoint for controlling the handling arm from the measurements acquired.

The invention claimed is:

1. A robotic system for use in agriculture, comprising:
at least one tool-carrying arm capable of carrying an agricultural tool and capable of being controlled to enable the agricultural tool to be raised or lowered,
a plant height measuring sensor, and
a calculator configured to determine, from measurements made by the plant height measuring sensor, a setpoint for controlling the at least one tool-carrying arm,
wherein the at least one tool-carrying arm is connected to a connection member for loading it on a handling arm provided on an agricultural vehicle, and
wherein the calculator is further configured to determine, from measurements made by the plant height measuring sensor, a setpoint for controlling the handling arm enabling the tool-carrying arm to be raised or lowered.

2. The robotic system according to claim 1, including at least two tool-carrying arms connected to the connection member, each tool-carrying arm being associated with a crop row,
wherein the calculator is configured to:
determine the setpoint for controlling each of the tool-carrying arms from measurements made by plant height measuring sensor and relative to the plants present in the crop row associated with the tool-carrying arm;
calculate an intermediate setpoint for controlling the handling arm for each of the crop rows from measurements made by the plant height measuring sensor and relative to the plants present in each of the crop rows; and
average the intermediate setpoints calculated for each of the crop rows to determine the setpoint for controlling the handling arm.

3. The robotic system according to claim 1, wherein the at least one tool-carrying arm has a clearance with an amplitude lower than that of a handling arm clearance.

4. The robotic system according to claim 1, wherein the calculator is configured to determine the setpoint for controlling the at least one tool-carrying arm based on measurements made by the plant height measuring sensor and relative to plants present over a first distance upstream of the current position of the agricultural tool in a vehicle path direction, and to determine the setpoint for controlling the handling arm based on measurements made by the plant height measuring sensor and relative to plants present over a second distance upstream of the current position of the agricultural tool in the vehicle path direction, the second distance being higher than the first distance.

5. The robotic system according to claim 4, further comprising a measuring sensor configured to measure a rate of advance in the vehicle path direction,
wherein the calculator is further configured to determine a distance travelled along the vehicle path direction between two measurements successively made by the height measuring sensor.

6. The robotic system according to claim 4, wherein the calculator is configured to determine the setpoints for controlling the at least one tool-carrying arm and the handling arm from an average of said measurements made by the plant height measuring sensor.

7. The robotic system according to claim 4, wherein the calculator is configured to determine the setpoints for controlling the at least one tool-carrying arm and the handling arm from a maximum of said measurements made by the plant height measuring sensor.

8. The robotic system according to claim 4, wherein the calculator is further configured to: calculate a leaf density indicating, for each height interval of a set of successive intervals, a percentage of measurements from among the measurements made by the plant height measuring sensor having a height value that is greater than that of a lower bound value of the height interval, and determine the setpoint for controlling the at least one tool-carrying arm and the setpoint for controlling the handling arm from the lower bound value of the height interval corresponding to a threshold value of the percentage.

9. The robotic system according to claim 1, wherein the height measuring sensor is a light curtain apparatus which comprises an emitter in the form of a column of light sources and a receiver in the form of a column of photoreceptors, the emitter and receiver being mounted so as to face each other and extend along their longitudinal direction perpendicular to the ground to enable the height of plants present therebetween to be measured.

10. The robotic system according to claim 1, wherein the height measuring sensor is a stereoscopic imaging system which comprises two cameras mounted so as to be able to image, from two distant points of view, a same scene located in front of the agricultural tool in a vehicle path direction, and a computing processing unit configured to make up, from the images delivered by the cameras, a 3D reconstruction representative of a relief of the scene imaged.

11. The robotic system according to claim 1, wherein the agricultural tool is a plant cutting or pulling tool.

12. The robotic system according to claim 1, wherein the agricultural tool is a plant cutting or pulling tool for maize.

13. An agricultural vehicle piece of equipment comprising:
the robotic system according to claim 1.

14. A vehicle comprising:
the agricultural vehicle piece of equipment according to claim 13.
15. A method for adjusting the height of an agricultural tool by the robotic system according to claim 1, comprising:
acquiring measurements from the plant height measuring sensor;
determining a setpoint for controlling the at least one tool-carrying arm from the measurements acquired; and
determining a setpoint for controlling the handling arm from the measurements acquired.

* * * * *